United States Patent Office 2,928,732
Patented Mar. 15, 1960

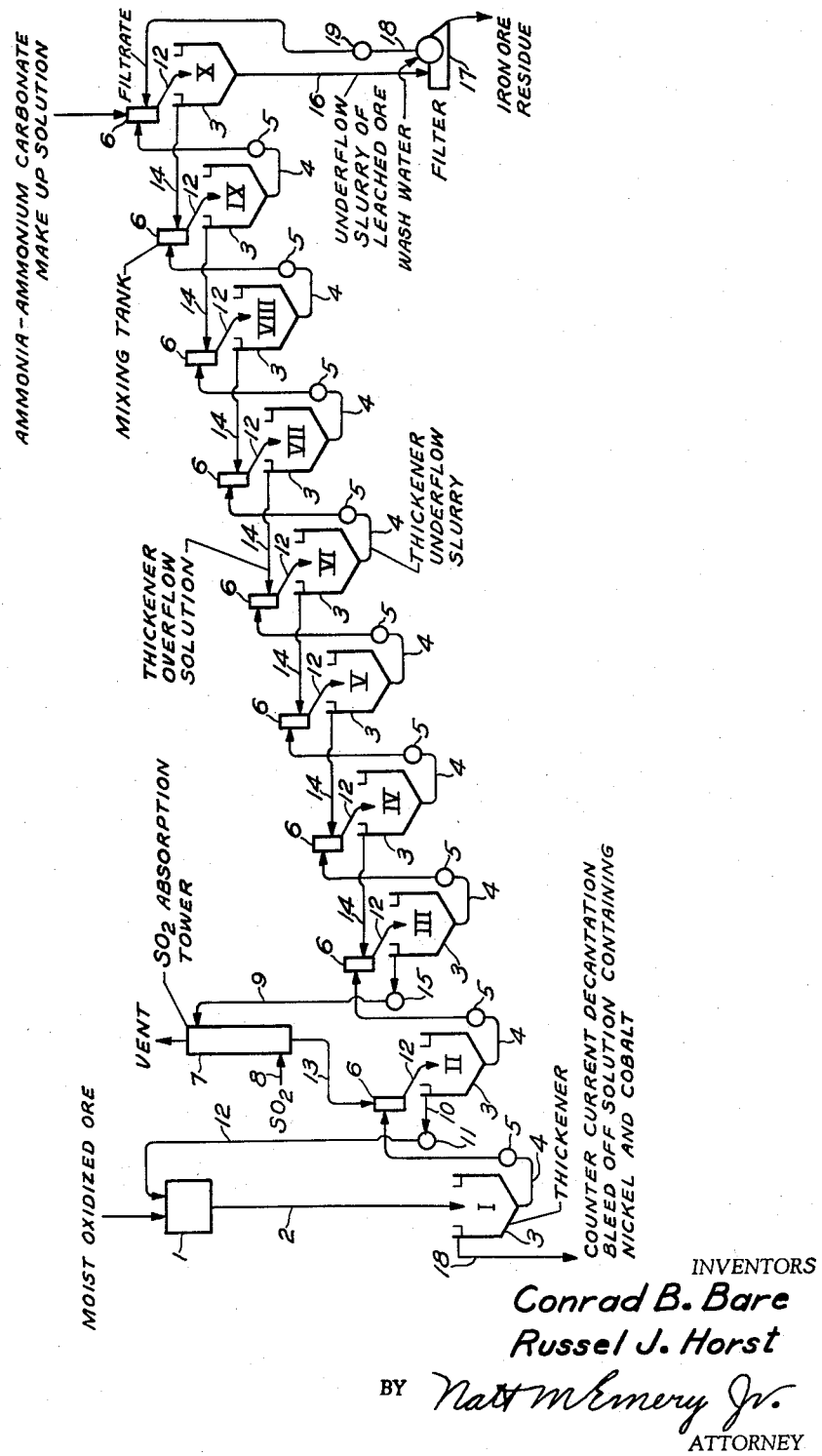

2,928,732

USE OF SO₂ IN AMMONIA LEACHING MAYARI ORE

Conrad B. Bare and Russel J. Horst, Lebanon, Pa., assignors to Bethlehem Steel Company, a corporation of Pennsylvania Application August 20, 1957, Serial No. 679,211

12 Claims. (Cl. 75—119)

This invention relates to the separation of nickel and cobalt from reduced iron ore of the nickeliferous lateritic, or Mayari, type by means of leaching with ammoniacal ammonium carbonate solution, and more particularly to such separation when the reduced ore contains sulfidic sulfur.

The principal object of this invention is to enhance the leaching characteristics of an ammoniacal ammonium carbonate leaching solution in the separation of nickel and cobalt from lateritic iron ore.

Another object is to reduce the amount of residual sulfur in the resultant iron ore product.

In the separation of nickel and cobalt from oxidic iron ore, for example an ore of the Mayari type, by means of an aqueous ammoniacal ammonium carbonate leaching solution, it is customary to first give the ore a reducing roast, during which the nickel and cobalt oxides are reduced to the metallic state. The reduced ore is then treated with an aqueous solution of an ammoniacal ammonium carbonate and a free oxygen-containing gas to solubilize the nickel and cobalt. Nickel and cobalt are then removed from the ore by thoroughly leaching with additional quantities of the ammoniacal ammonium carbonate solution. By means of the steps just outlined, an iron ore product can be obtained which is sufficiently low in nickel and cobalt so that the treated ore is acceptable as a blast furnace charge.

However, in the treatment of reduced ore of the type mentioned, when leaching and washing are carried out under conditions encountered in commercial operations, the extractions of cobalt with ammoniacal ammonium carbonate solutions have always been poor, compared to those obtained in the laboratory under ideal conditions. In large scale operations, leach solution temperatures are seldom less than 100° F., especially in subtropical climes, and the time of contact of the ore with solution in countercurrent decantation systems is a matter of hours. We have observed that the higher the temperature and the longer the detention time in the thickening stages of a counter-current decantation system, the poorer will be the extraction of cobalt. This is shown in a series of tests wherein all conditions were maintained constant except for either temperature or detention time. The results of these tests are shown in Table I, below:

*Table I*

| Test No. | Solution Temperature, °F. | Detention time per stage, hours | Cobalt extraction, Percent |
|---|---|---|---|
| 1 | 95 | 3 | 81 |
| 2 | 110 | 3 | 69 |
| 3 | 125 | 3 | 61 |
| 4 | 110 | 0.75 | 78 |
| 5 | 110 | 3 | 71 |
| 6 | 110 | 6 | 57 |
| 7 | 110 | 12 | 47 |

We have found that the adverse effect of temperature and detention time upon the extraction of cobalt is due to the presence of sulfidic sulfur in the reduced ore, and can be overcome when a sufficient amount of a sulfur compound, one which will produce sulfite ions, $(SO_3)^=$, is added to the leach solution. It is believed that the sulfide ions react with sulfide sulfur, $S^=$, which is present in the reduced ore to form soluble sulfur compounds. These compounds are predominantly thiosulfates, and they do not interfere with the extraction and recovery of cobalt. This indicates that the reaction of sulfide sulfur with cobalt, in the reduced ore, is largely, if not entirely, responsible for the poor extraction obtained in the prior practice, where there are no sulfite ions present in solution. The foregoing conclusion is substantiated by the fact that whereas the sulfur content of the ore remains practically unchanged in the absence of sulfite ions, the sulfur content of the ore is substantially reduced when leaching in the presence of sulfite ions. Thus, in addition to the increased recovery of cobalt from the ore, another advantage accruing from the use of sulfite ions in the leach solution is the low residual sulfur content in the leached iron ore product.

A second series of tests was run to show the increase in the extraction of cobalt, realized by the addition of a sulfite-iron producing compound. Referring to Table I, tests 1, 2 and 3 were repeated, adding, in each case, 5.2 pounds of sulfur (in the form of $SO_2$) per ton of ore treated, and tests 4, 5 and 7 were repeated, adding, in each case, 10.4 pounds of sulfur (in the form of $SO_2$) per ton of ore treated. In each test of this second series the cobalt extraction was 88% to 89%, representing a considerable increase in extraction for the range of conditions investigated in these tests.

Satisfactory results have been obtained with $SO_2$ addition at temperatures as high as 140° F.

It is to be noted that the sulfide sulfur in the reduced ore may come from one or more sources. The ore itself contains sulfur (upwards of 0.05%). The ore may become contaminated with sulfur during the processing that takes place before treating and leaching, as, for example, the contamination that takes place when the ore picks up sulfur from a sulfur containing fuel used for reduction.

While our process is essentially one in which the cobalt and nickel of the reduced sulfidic sulfur-containing ore is solubilized in aqueous ammoniacal ammonium carbonate solution, and an oxidizing medium, in the presence of a sulfite-ion producing compound, various modifications for performing the process will become apparent. For example, in one form of recovering nickel and cobalt from a Mayari type ore, ammoniacal ammonium carbonate solution is added to the ore to form a slurry, and the slurry aerated to solubilize nickel and cobalt. The ore is then leached with additional ammoniacal ammonium carbonate solution. We have found that improved recoveries result when leaching is accompanied by adding a sulfite ion-producing material to the leach solution. The sulfite ion-producing material may be added to the solution forming the slurry, rather than to the leaching solution, if desired. Our invention is also applicable to the method wherein the nickel and cobalt are solubilized and leached in one operation.

While the foregoing methods of extracting nickel and cobalt are practical, we prefer to use a superior method in which the reduced ore is first moistened with ammonical ammonium carbonate solution, and the nickel and cobalt oxidized with a free oxygen-containing gas, the ore then being leached thoroughly by counter current decantation with ammoniacal ammonium carbonate solution, with addition of $SO_2$ gas, or other sulfite ion-producing compound, during the leaching step. In this modification, the sulfite ion-producing compound may, if preferred, be added to the moistening solution.

The flow sheet in the accompanying drawing illustrates a ten-stage counter current decantation system and indicates one method by which sulfur may be introduced into the leach solution.

In one specific example, which illustrates the manner in which our process may be performed, a Mayari ore may be used which corresponds to the following composition:

| | Percent (dry basis) |
|---|---|
| Fe | 48.9 |
| Ni | 1.01 |
| Co | 0.17 |
| S | 0.17 |
| $Al_2O_3$ | 7.2 |
| $SiO_2$ | 3.0 |
| Ignition loss | 14.5 |

The ore, in a finely divided state, is dried at 250° F. The dried ore is then reduced in a reducing furnace for a period of two hours at a temperature of 1200° F. The reducing atmosphere used in the furnace is a 1 to 1 mixture of carbon dioxide and carbon monoxide. The reduced ore is cooled in the reducing atmosphere and mixed with an aqueous ammoniacal ammonium carbonate solution in an amount sufficient to moisten the ore, but less than the quantity required to form a slurry with the ore. This treatment is performed in a non-oxidizing atmosphere. The ammoniacal ammonium carbonate solution, used in this step, contains approximately 200 grams per liter of ammonia ($NH_3$) and approximately 160 grams per liter of carbon dioxide ($CO_2$).

The moistened, reduced ore is then treated in a fluidized condition in the presence of a gas mixture consisting of 3% oxygen, 67% ammonia ($NH_3$) and 30% nitrogen, for a period of twenty minutes. During this oxidation step, the nickel and cobalt are so conditioned as to make them amenable to extraction by means of a leaching solution.

Following oxidation, the ore is leached by countercurrent decantation in a series of ten stages, or thickeners. Referring now to the drawing, an aqueous ammoniacal ammonium carbonate leaching solution, containing approximately 160 grams per liter of $NH_3$ and approximately 120 grams per liter of $CO_2$, is mixed in tank 6 with the slurry from stage IX thickener 3, and is introduced into the ten-stage leaching system at stage X, while the moist oxidized ore is mixed in tank 1 with overflow solution from the stage II thickener and is introduced into the system at stage I. The ore is then moved through the leaching system counter-current to the leaching solution. The ore, after settling in thickener 3 at stage I for 3 hours is pumped as a slurry through pipe 4 by means of pump 5 to mixing tank 6, where the slurry is contacted with effluent leach solution which has been reacted with $SO_2$ gas in tank 7. The leach solution enters the mixing tank 6 by way of pipe 13. After thoroughly mixing the slurry and leaching solution in tank 6, the mixture is introduced into thickener 3 at stage II by way of pipe 12. After a three hour detention time at stage II, the slurry is pumped from the thickener through pipe 4 by means of pump 5 to the next mixing tank 6. Overflow from the stage II thickener is pumped through pipe 10 by means of pump 11 to tank 1. The slurry from stage II is mixed, in mixer 6, with overflow leach solution from a later stage, specifically, stage IV, and this is then introduced into thickener stage III. Following the normal detention time, the slurry is withdrawn from the stage III thickener and pumped by pump 5 through pipe 4 to mixing tank 6, where the slurry is mixed with overflow leach solution as in the mixing operation prior to the previous thickener stage. Overflow leach solution from stage III is pumped through pipe 9 by means of pump 15 to $SO_2$ absorption tower 7 where $SO_2$ equal to 5.2 lbs. of sulfur per ton of ore treated is absorbed by the solution. The slurry from stage III, which is mixed in mixer 6, is introduced into thickener stage IV through pipe 12, and, after the normal 3 hour detention time, is passed through each succeeding thickener stage, to, and including, stage X. The overflow from stage IV flows to stage III mixing tank. In each of the succeeding thickener stages, i.e. from stage V to stage X, the ore is treated as in stage IV, being mixed prior to thickening with overflow leach solution from a later stage, the overflow from the thickener going to the mixing tank of the previous stage. Detention time for each stage is three hours, and the temperature of the leaching solution is maintained at about 110° F. The final overflow solution, that which leaves stage I by way of pipe 18, contains substantially all of the extractable nickel and cobalt present in the original ore. The thoroughly leached ore, still in the form of a slurry, is withdrawn from stage X by pipe 16 and is filtered at filter 17, producing a filter cake of iron ore residue. The filtrate is returned to the leaching system through pipe 18 by means of pump 19.

When the conditions set forth in the foregoing example were simulated in the laboratory, the cobalt extraction was 88%, the results being shown as test number 4 of Table II.

It should be pointed out that it is not necessary to introduce the $SO_2$ to the system at stage II, as shown, although stage II is the most desirable point for the entrance of the sulfur compound from the standpoint of low sulfur in the residual iron ore. In the foregoing example, make-up leaching solution is added to stage X in an amount sufficient to produce a solution containing 8 to 10 g./l. of nickel in the solution withdrawn from the first thickener stage.

During the leaching operation, sulfur dioxide ($SO_2$) gas, in an amount equal to approximately 5 pounds of sulfur per ton of ore treated, is added to the system at the third stage overflow, or at the point where the solution from the third thickener overflows into the second thickener. The resultant leach solution contains nearly all of the nickel and cobalt substantially free of iron.

We have found that by operating under the conditions described, we are able to obtain a very satisfactory increase in cobalt extraction. However, it is to be understood that the procedure just described can be varied as to the strength and amount of leaching solution, sulfite ion-producing compound, detention time, number of leaching stages, etc.

Using the foregoing process, but varying the amount of $SO_2$ in each instance, a series of tests was conducted to ascertain the effect of differing amounts of $SO_2$ on total cobalt extraction. In these tests, the leach solution temperature was 110° F., and the detention time per stage was three hours. The results of these tests are given in Table II.

Table II

| Test No. | Sulfur (S), added as $SO_2$ lb./ton of ore | Leached Residue, Percent Sulfur (S) | Leached Residue, Percent Cobalt | Extraction, Percent of Total Cobalt |
|---|---|---|---|---|
| 1 | 0 | 0.17 | 0.061 | 69 |
| 2 | 1.3 | 0.12 | 0.049 | 75 |
| 3 | 2.6 | 0.07 | 0.037 | 80 |
| 4 | 5.2 | 0.04 | 0.023 | 88 |
| 5 | 10.4 | 0.04 | 0.020 | 89 |

It will be noted from the table when 5.2 pounds of sulfur, when in the form of sulfite ion, per ton of ore are added to the ammoniacal ammonium carbonate leach, there is an increase of nearly 20% in the recovery of cobalt from the ore, which is equal to nearly 0.8 pound of cobalt per ton of leached ore. Likewise, when 5.2 pounds of sulfur are added to the leach, the residual sulfur in the leached ore drops from 0.17% to 0.04%. In any large scale iron ore treating project, an appreciation of nearly twenty percent in cobalt recovery would have considerable effect on the economics of the process. In addition, the residual cobalt and sulfur contents of leached ore are lowered.

While the results of Table II were obtained with a leach solution containing 160 g./l. of $NH_3$ and 120 g./l. of $CO_2$, highly satisfactory results were obtained for both cobalt extraction and residual sulfur in leached ore when the concentration of the leach solution was decreased. Moreover, addition of $SO_2$ will improve cobalt extraction for all practicable concentrations of ammoniacal ammonium carbonate leaching solutions. Comparative results from two leach solutions, each of a different concentration, are given in the following table:

Table III

| Test No. | Leach Solution, g./l.$NH_3$ | Leach Solution, g./l.$CO_2$ | Sulfur (S) added as $SO_2$, lb./ton of ore | Leached Residue, Percent Sulfur (S) | Leached Residue, Percent Cobalt | Extraction, Percent of Total Cobalt |
|---|---|---|---|---|---|---|
| 1 | 110 | 95 | 0 | 0.16 | 0.076 | 63 |
| 2 | 110 | 95 | 10.4 | 0.03 | 0.030 | 85 |
| 3 | 80 | 50 | 0 | 0.17 | 0.103 | 48 |
| 4 | 80 | 50 | 10.4 | 0.05 | 0.055 | 74 |

In each of the tests in Tables II and III, the temperature of the leach solution was 110° F. and detention time was 3 hours per stage. While the cobalt, present in the leach solution, has increasing solubility below 110° F., because of physical limitations it is impractical to attempt to maintain the temperature below 95° F. in our process.

Our process of adding a sulfite ion to the leach solution is particularly applicable to reduced ores having a sulfur content in excess of 0.05%.

The introduction of sulfite ion into the leach solution is not limited to the use of sulfur dioxide gas. High cobalt extractions have been obtained when sodium sulfite ($Na_2SO_3$) has been added to the leach at the third stage thickener, in place of $SO_2$ gas. Other alkali metal sulfites may be used. In fact, any compound may be used which will effectively provide sulfite ions in the leach solution, and which will not contaminate the iron product, or the recovered nickel and cobalt.

While we prefer to add $SO_2$ gas, or its equivalent, to the leach solution which overflows from the third thickener in a 10 stage leaching operation, it is not mandatory that the sulfite-ion producing compound be added at this point. As far as cobalt extraction is concerned, the sulfite ion-producing compound may be added to the solution at any point in the leaching process. However, in order to prevent sulfur contamination of the leached ore product (by the leach solution itself) it is desirable that the sulfite ion-producing compound be added to the system at some point prior to the last thickener stage, and preferably in the forward half of the system.

The sulfite ion-producing compound may be added to the solution which is used to moisten, or treat, the reduced ore, rather than to the leach solution, if desired.

We claim:

1. The method of extracting nickel and cobalt from reduced oxidic iron ore containing nickel, cobalt and sulfidic sulfur which comprises treating said ore with ammoniacal ammonium carbonate solution in the presence of an oxidizing gas and sulfite ion.

2. The method of extracting nickel and cobalt from reduced oxidic iron ore containing nickel, cobalt and sulfidic sulfur which comprises treating said ore with ammoniacal ammonium carbonate solution and an oxidizing gas in the presence of sulfite ion.

3. The method of extracting nickel and cobalt from reduced oxidic iron ore containing nickel, cobalt and sulfidic sulfur which comprises treating said ore with a sulfite-ion producing material during at least one of the sequential steps comprising (1) adding ammoniacal ammonium carbonate solution to the ore and oxidizing the ore, and (2) leaching the ore with ammoniacal ammonium carbonate solution.

4. The method of extracting nickel and cobalt from reduced oxidic iron ore containing nickel, cobalt and sulfidic sulfur which comprises adding ammoniacal ammonium carbonate solution to said ore and oxidizing the ore, and leaching the ore with ammoniacal ammonium carbonate solution in the presence of sulfite ion.

5. The method of treating a reduced Mayari type ore containing sulfidic sulfur which comprises moistening said ore with ammoniacal ammonium carbonate solution and oxidizing the ore, and leaching the ore with ammoniacal ammonium carbonate solution in the presence of sulfite ion.

6. The method of treating a reduced Mayari type ore containing sulfidic sulfur which comprises moistening said ore with ammoniacal ammonium carbonate solution and oxidizing the ore, and leaching the ore with a solution of ammoniacal ammonium carbonate and sulfur dioxide.

7. The method of treating a reduced Mayari type ore containing sulfidic sulfur which comprises moistening said ore with ammoniacal ammonium carbonate solution and oxidizing the ore, and leaching the ore with a solution of ammoniacal ammonium carbonate and sodium sulfite.

8. The method of treating reduced Mayari type ore containing sulfidic sulfur which comprises moistening the reduced ore with aqueous ammoniacal ammonium carbonate solution, oxidizing the reduced ore, then leaching the ore with an aqueous solution containing not less than 40 g./l. of $NH_3$, not less than 20 g./l. of $CO_2$ and a sulfite ion-producing compound in an amount not less than 1.3 pounds of sulfur per ton of ore treated.

9. The method of extracting nickel and cobalt from a reduced nickeliferous lateritic ore containing sulfidic sulfur which comprises adding aqueous ammoniacal ammonium carbonate solution to the ore and oxidizing the ore, then leaching the ore by counter-current decantation with an aqueous solution of ammoniacal ammonium carbonate in a series of stages and adding a sulfite ion-producing material to the leaching solution prior to the ultimate stage.

10. The method of treating Mayari type ore which comprises moistening reduced Mayari type ore containing sulfidic sulfur with an ammoniacal ammonium carbonate solution containing sulfite ions and oxidizing the ore with a free oxygen-containing gas and then leaching the ore with ammoniacal ammonium carbonate solution.

11. The method of extracting nickel and cobalt from reduced oxidic iron ore containing nickel, cobalt and small amounts of sulfidic sulfur which comprises treating said ore with ammoniacal ammonium carbonate solution in the presence of an oxidizing medium and sulfite ion in the amount of at least 0.65 gram of sulfur per liter of said solution and thereby lowering the amount of sulfidic sulfur in said ore and increasing the extraction of said cobalt.

12. The method of extracting nickel and cobalt from reduced oxidic iron ore containing nickel, cobalt and small amounts of sulfidic sulfur which comprises treating said ore with a sulfite ion-producing material having at least one pound of sulfur per ton of said ore treated during at least one of the sequential steps comprising (1) adding ammoniacal ammonium carbonate solution to the ore and oxidizing the ore, and (2) leaching the ore with ammoniacal ammonium carbonate solution and thereby lowering the amount of sulfidic sulfur in said ore and increasing the extraction of said cobalt.

References Cited in the file of this patent

UNITED STATES PATENTS

| 2,687,953 | Kenny et al. | Aug. 31, 1954 |
| 2,717,829 | Dougherty | Sept. 13, 1955 |
| 2,726,934 | Forward et al. | Dec. 13, 1955 |
| 2,727,818 | Kenny et al. | Dec. 20, 1955 |

FOREIGN PATENTS

| 722,373 | Great Britain | Jan. 26, 1955 |

UNITED STATES PATENT OFFICE
CERTIFICATE OF CORRECTION

Patent No. 2,928,732                                          March 15, 1960

Conrad B. Bare et al.

It is hereby certified that error appears in the printed specification of the above numbered patent requiring correction and that the said Letters Patent should read as corrected below.

Column 2, line 3, for "sulfide ions" read -- sulfite ions --; line 22, for "sulfite-iron" read -- sulfite-ion --.

Signed and sealed this 20th day of September 1960.

(SEAL)
Attest:

KARL H. AXLINE
Attesting Officer

ROBERT C. WATSON
Commissioner of Patents